United States Patent
Widmaier et al.

(10) Patent No.: US 11,175,678 B2
(45) Date of Patent: Nov. 16, 2021

(54) METHOD AND DEVICE FOR LATERAL STABILIZATION FOR A SINGLE-TRACKED MOTOR VEHICLE AT A STANDSTILL

(71) Applicant: Robert Bosch GmbH, Stuttgart (DE)

(72) Inventors: Georg Widmaier, Leonberg (DE); Alessandro Moia, Holzgerlingen (DE); Silas Klug, Magstadt (DE); Jochen Fassnacht, Calw (DE); Klaus Beulich, Weil der Stadt (DE)

(73) Assignee: Robert Bosch GmbH, Stuttgart (DE)

( * ) Notice: Subject to any disclaimer, the term of this patent is extended or adjusted under 35 U.S.C. 154(b) by 260 days.

(21) Appl. No.: 16/452,216

(22) Filed: Jun. 25, 2019

(65) Prior Publication Data

US 2020/0004271 A1 Jan. 2, 2020

(30) Foreign Application Priority Data

Jun. 27, 2018 (DE) .......................... 102018210465.5

(51) Int. Cl.
*G05D 1/08* (2006.01)
*B62K 11/00* (2006.01)
*B62J 45/415* (2020.01)

(52) U.S. Cl.
CPC ............ *G05D 1/0891* (2013.01); *B62K 11/00* (2013.01); *B62J 45/4151* (2020.02)

(58) Field of Classification Search
CPC .................................................. G05D 1/0891
See application file for complete search history.

(56) References Cited

U.S. PATENT DOCUMENTS

| 6,360,838 | B1* | 3/2002 | Kulhavy | B62D 37/06 180/219 |
| 10,245,952 | B1* | 4/2019 | Patterson | B60B 19/003 |
| 2008/0295595 | A1 | 12/2008 | Tacklind et al. | |
| 2016/0325739 | A1* | 11/2016 | Litz | G05D 1/0891 |
| 2018/0024558 | A1 | 1/2018 | Tacklind et al. | |
| 2019/0077480 | A1* | 3/2019 | Bailey | A61M 1/75 |

FOREIGN PATENT DOCUMENTS

DE 102005059361 8/2006

OTHER PUBLICATIONS

Forro, Tibor "Self-balancing bicycle robot track stands", YouTube video accessible at https://www.youtube.com/watch?v=dzzpBBFQmW4, 1 minute 23 sec to 1 minute 29 sec. posted Oct. 29, 2017 (Year: 2017).*

(Continued)

*Primary Examiner* — Peter D Nolan
*Assistant Examiner* — Tanya C Sienko
(74) *Attorney, Agent, or Firm* — Norton Rose Fulbright US LLP; Gerard Messina

(57) ABSTRACT

A method for laterally stabilizing a single-tracked motor vehicle, driven with the aid of an electric motor, that is in a vertically aligned state and at a standstill. The front wheel of the motor vehicle has a steering angle in which the electric motor is controlled in such a way that it exerts drive torques on the motor vehicle that act in alternation in the forward direction and in the reverse direction.

12 Claims, 2 Drawing Sheets

(56) References Cited

OTHER PUBLICATIONS

Forro, Tibor "Self-balancing bicycle robot track stands", YouTube video accessible at https://www.youtube.com/watch?v=dzzpBBFQmW4, comments by Tibor under posting (copy attached, taken May 7, 2021) (Year: 2019).*
Wikipedia "Track Stand", accessed May 6, 2021 (Year: 2021).*
K. Cameron, "Honda Shows Self-Balancing But Non-Gyro Bike" Cycle World, accessed at https://www.cycleworld.com/honda-self-balancing-motorcycle-rider-assist-technology/ Jan. 6, 2017. (Year: 2017).*
B. Sorokanich, "Honda Just Invented a Self-Balancing Motorcycle That Never Falls Over", Road & Track, Accessed at https://www.roadandtrack.com/new-cars/car-technology/news/a32162/honda-just-invented-a-self-balancing-motorcycle-that-never-falls-over/ Jan. 5, 2017 (Year: 2017).*

* cited by examiner

METHOD AND DEVICE FOR LATERAL STABILIZATION FOR A SINGLE-TRACKED MOTOR VEHICLE AT A STANDSTILL

RELATED APPLICATION INFORMATION

The present application claims priority to and the benefit of German patent application no. 10 2018 210 465.4, which was filed in Germany on Jun. 27, 2018, the disclosure of which is incorporated herein by reference.

FIELD OF THE INVENTION

The present invention relates to a method for laterally stabilizing a single-tracked motor vehicle, driven with the aid of an electric motor.

BACKGROUND INFORMATION

Patent document DE 10 2005 059 361 A1 relates to a two-wheeled, battery-operated vehicle for a person who is standing on a platform of the vehicle and is holding the platform in an angular position corresponding to the body position via a structure situated on the platform, in which, based on a sensor device that ascertains the angular position of the platform with respect to the horizontal, a wheel drive is controlled in such a way that the wheel drive holds the vehicle together with the person in equilibrium by acceleration and deceleration, and in which a separate left-right control to be actuated by different drive speeds of the two wheels is provided.

SUMMARY OF THE INVENTION

The present invention relates to a method for laterally stabilizing a single-tracked motor vehicle, driven with the aid of an electric motor, that is in a vertically aligned state and at a standstill, the front wheel of the motor vehicle having a steering angle in which the electric motor is controlled in such a way that it exerts drive torques on the motor vehicle that act in alternation in the forward direction and in the reverse direction. This allows the rider to remain seated on the vehicle without having to use the legs to support the vehicle against tipping over, as is the case, for example, when stopped at a traffic light.

One advantageous embodiment of the present invention is characterized in that the lateral tilt direction of the motor vehicle is ascertained with the aid of a sensor system, and when the tilt direction points in the direction of the steering angle, the electric motor is controlled in such a way that it exerts a drive torque that acts on the motor vehicle in the forward direction, and when the tilt direction points in the opposite direction of the steering angle, the electric motor is controlled in such a way that it exerts a drive torque that acts on the motor vehicle in the reverse direction. Balancing of the vehicle is ensured in this way.

One advantageous embodiment of the present invention is characterized in that the method is deactivated when the rider signals an intent to start and at the same time actuates the steering by actuating a motor torque request element.

One advantageous embodiment of the present invention is characterized in that the single-tracked motor vehicle is an electric scooter.

One advantageous embodiment of the present invention is characterized in that in the vertically aligned state of the motor vehicle the value of the roll angle is zero, and the motor vehicle is laterally stabilized by regulating the roll angle to the value zero. The roll angle is the lateral inclination angle of the vehicle. The roll angle assumes the value zero for a vertically aligned vehicle, and increases with an increasingly inclined position until it has the approximate value of 90 degrees for a tipped-over vehicle.

One advantageous embodiment of the present invention is characterized in that the tilt direction is ascertained with the aid of an inertial sensor system.

Moreover, the present invention encompasses a device containing an arrangement/stabilizing device that are configured for carrying out the method according to the present invention. The arrangement/stabilizing device in particular is a control unit in which the program code for carrying out the method according to the present invention is stored.

The drawings encompass FIGS. 1 through 3.

DETAILED DESCRIPTION

The present invention relates to a self-stabilization function for an electric scooter or some other single-tracked motor vehicle at a standstill, the stabilization function being intended to be implemented without additional components. The present invention allows the rider to sit on the scooter, even when it is at a standstill, without having to place the feet on the ground. This is suitable, for example, when stopped at a traffic light, in that the scooter, similarly as with a Segway SEGWAY®, stabilizes itself. However, the stabilization takes place in the transverse direction, whereas with a Segway SEGWAY® it takes place in the longitudinal direction of travel.

Figure 1:
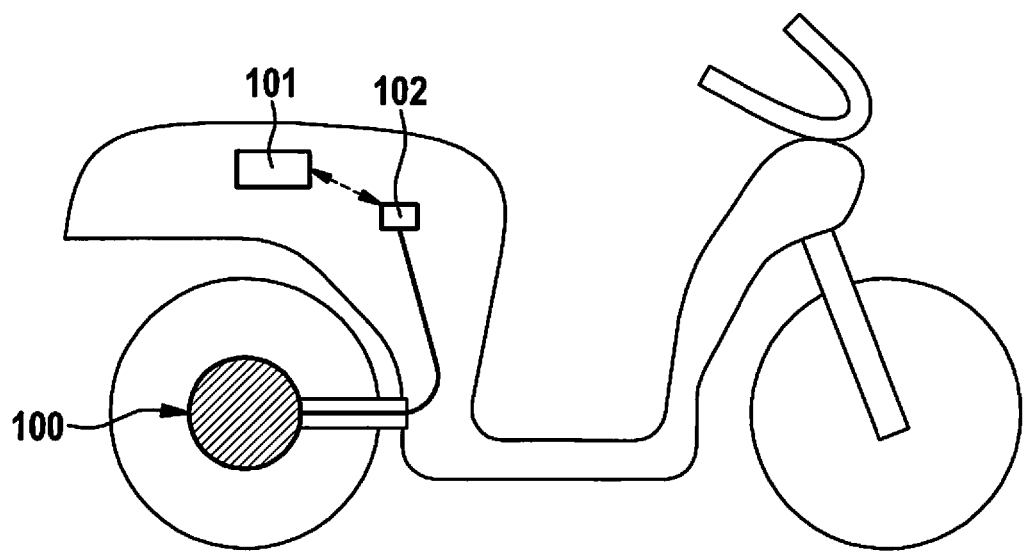
FIG. 1 illustrates an electric scooter in a side view.

FIG. 1 shows a side view of one possible vehicle in which the present invention may be applied. In the electric scooter illustrated, reference numeral 100 denotes the electric motor driving the rear wheel, reference numeral 101 denotes an inertial sensor system that is used, for example, for ascertaining the roll angle, and reference numeral 102 denotes a control unit in which the program code for carrying out the present invention is contained and runs. The vehicle illustrated by way of example in FIG. 1 is an electric scooter with an electric motor 100 at the rear axle. This electric motor 100 is controlled by control unit 102. Control unit 102 is connected to an inertial sensor system 101 which may measure the roll speeds and the accelerations about the relevant axes. The roll speed is understood to mean the angular velocity about the longitudinal axis of the vehicle. The roll angle is the rotational angle about the longitudinal axis of the vehicle.

Figure 2:
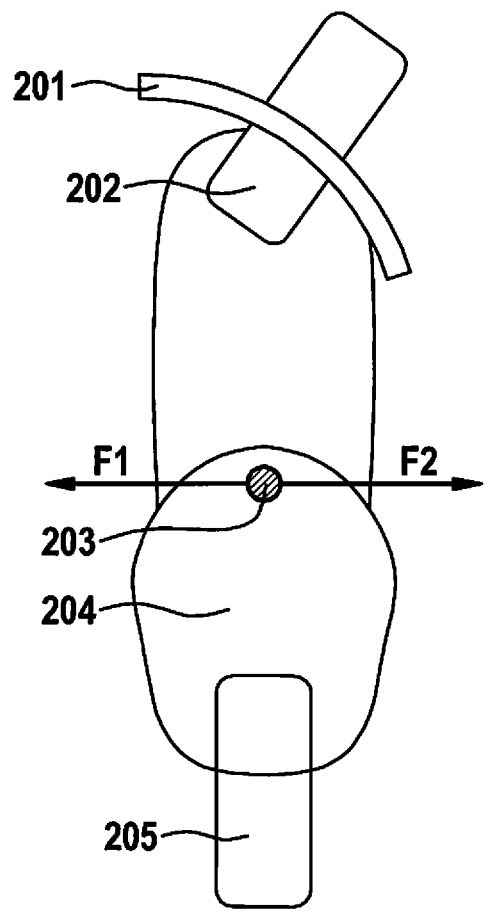
FIG. 2 illustrates an electric scooter at a standstill in a top view.

In order to balance the electric scooter, the drive torque exerted by drive motor 100 must at the same time be expressed as lateral forces that occur. For this reason, when the vehicle is at a standstill the rider must hold the handlebar at a lateral steering angle, as illustrated in FIG. 2. In the figure, handlebar 201 and thus front wheel 202 are steered to the right. FIG. 2 shows an electric scooter in a top view; the scooter is at a standstill, and in the diagram handlebar 201 is held at the right limit stop. The rider is sitting on seat 204. Reference numeral 205 denotes the rear wheel of the electric scooter. In this situation the following takes place:

When the electric motor provides a positive torque, which moves the electric scooter in the forward direction, a force F1 acting to the left acts on center of gravity 203.

When the electric motor provides a negative torque, which moves the electric scooter in the reverse direction, a force F2 acting to the right acts on center of gravity 203.

As a result of this effect, it is possible to modulate the lateral forces acting on the center of gravity, in that the motor torque of the electric motor is always selected in such a way that a beginning tendency to tip over is counteracted by changing the direction of transverse forces F1 or F2 that arise.

Figure 3:
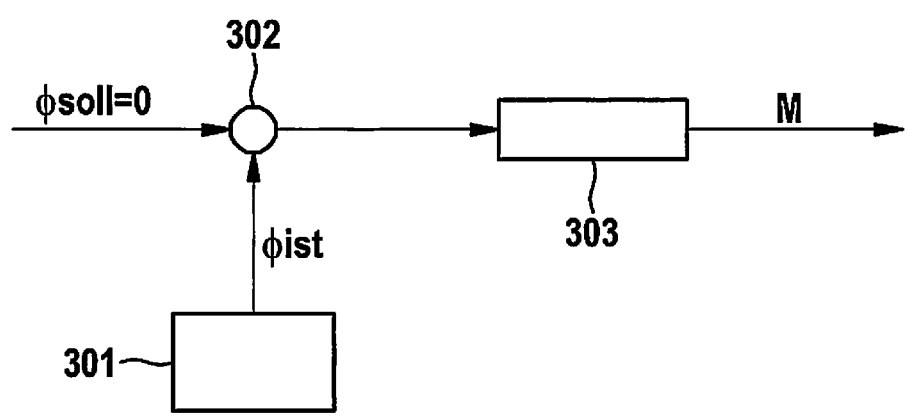
FIG. 3 illustrates a controller structure for carrying out the self-stabilization function.

FIG. 3 illustrates a controller structure that is suitable for the self-stabilization of a single-tracked motor vehicle. The controller may be used in the following steps:

1) The presence of a standstill of the single-tracked motor vehicle is detected.
2) The motor torque is slightly modulated, and the output signals of the inertial sensor system are evaluated to ascertain whether the brake is no longer actuated, and to determine the direction of the steering angle.
3) If the roadway has a longitudinal inclination, the motor acts as a hillholder and holds the scooter at a standstill, without the rider having to keep the brake actuated.
4) The parameters of the controller are adapted to the situation, for example to the direction of the handlebar, the roadway inclination, or the weight of the rider.
5) The controller is switched on and the scooter is held in the upright position, i.e., ϕsetpoint=0, where ϕsetpoint is the setpoint value of the roll angle. Setpoint value ϕsetpoint is compared to actual value ϕactual of the roll angle, ascertained by inertial sensor system 301, in block 302, and the deviation is supplied to controller 303, which requests motor torque M necessary for keeping the two-wheeled vehicle stable.

The longitudinal movement of the two-wheeled vehicle, similarly as with a Segway SEGWAY®, is modulated very gently so that there is little or no perception of same by the rider.

6) The controller recognizes when the rider once again moves the handlebar, and accelerates the vehicle to move it forward, and then switches off.
7) Step 1) is repeated at the next stop situation.

What is claimed is:

1. A method for laterally stabilizing a single-tracked motor vehicle, driven with the aid of an electric motor, the method comprising:
   in response to detecting that the motor vehicle has entered into a state of being at a standstill by a rider, who is riding the motor vehicle, manually operating the motor vehicle to thereby decelerate the motor vehicle into the state, a controller of the motor vehicle automatically controlling the electric motor so that the electric motor exerts drive torques on the motor vehicle that act in alternation in a forward direction and in a reverse direction while a front wheel of the motor vehicle is at a non-zero angle relative to a longitudinal axis of the motor vehicle, thereby maintaining the motor vehicle in a vertically aligned state.

2. The method of claim 1, wherein a lateral tilt direction of the motor vehicle is ascertained with a sensor system, and when the tilt direction points in the direction of the angle of the front wheel, the electric motor is controlled so that the electric motor exerts a drive torque that acts on the motor vehicle in the forward direction, and when the tilt direction points in the opposite direction of the steering angle, the electric motor is controlled so that the electric motor exerts a drive torque that acts on the motor vehicle in the reverse direction.

3. The method of claim 2, wherein the tilt direction is ascertained with an inertial sensor system.

4. The method of claim 1, wherein the method is deactivated in response to a detection of an operation by the rider moving a handlebar of the motor vehicle.

5. The method of claim 1, wherein the single-tracked motor vehicle is an electric scooter.

6. The method of claim 1, wherein, in the vertically aligned state of the motor vehicle, a value of a roll angle is zero, and the motor vehicle is laterally stabilized by regulating the roll angle to the value zero.

7. A stabilizing device for laterally stabilizing a single-tracked motor vehicle, driven with the aid of an electric motor, the stabilizing device comprising a processor communicatively coupled to the electric motor and configured to perform the following method:
   in response to the processor detecting that the motor vehicle has entered into a state of being at a standstill by a rider, who is riding the motor vehicle, manually operating the motor vehicle to thereby decelerate the motor vehicle into the state, a controller of the motor vehicle automatically controlling the electric motor so that the electric motor exerts drive torques on the motor vehicle that act in alternation in a forward direction and in a reverse direction while a front wheel of the motor vehicle is at a non-zero angle relative to a longitudinal axis of the motor vehicle, thereby maintaining the motor vehicle in a vertically aligned state.

8. The stabilizing device of claim 7, wherein a lateral tilt direction of the motor vehicle is ascertained with a sensor system, and when the tilt direction points in the direction of the angle of the front wheel, the electric motor is controlled so that the electric motor exerts a drive torque that acts on the motor vehicle in the forward direction, and when the tilt direction points in the opposite direction of the steering angle, the electric motor is controlled so that the electric motor exerts a drive torque that acts on the motor vehicle in the reverse direction.

9. The stabilizing device of claim 8, wherein the tilt direction is ascertained with an inertial sensor system.

10. The stabilizing device of claim 7, wherein the method is deactivated in response to a detection of an operation by the rider moving a handlebar of the motor vehicle.

11. The stabilizing device of claim 7, wherein the single-tracked motor vehicle is an electric scooter.

12. The stabilizing device of claim 7, wherein, in the vertically aligned state of the motor vehicle, a value of a roll angle is zero, and the motor vehicle is laterally stabilized by regulating the roll angle to the value zero.

* * * * *